United States Patent [19]

Sicre et al.

[11] 4,232,839
[45] Nov. 11, 1980

[54] METHOD AND SYSTEM FOR CONTROLLING THE DECELERATED APPROACH OF AN AERODYNE

[75] Inventors: Jean-Luc Sicre, Meudon la Foret; Daniel Gruaz, Le Chesnay, both of France

[73] Assignee: Societe Francaise d'Equipements pour la Navigation Aerienne (S.F.E.N.A.), Velizy-Villacoublay, France

[21] Appl. No.: 850,134

[22] Filed: Nov. 10, 1977

[30] Foreign Application Priority Data

Nov. 12, 1976 [FR] France .................... 76 342181
Oct. 12, 1977 [FR] France .................... 77 30703

[51] Int. Cl.$^3$ .................... G05D 1/00; G05D 1/12
[52] U.S. Cl. .................... 244/188; 244/186; 364/430
[58] Field of Search .................... 244/186, 188; 364/430, 364/431, 433, 440, 200, 900

[56] References Cited

U.S. PATENT DOCUMENTS

| 3,786,505 | 1/1974 | Rennie | 364/430 |
| 3,868,497 | 2/1975 | Vietor | 244/186 |
| 4,042,197 | 8/1977 | Boyle | 244/188 |
| 4,050,096 | 9/1977 | Bennett et al. | 364/200 |

OTHER PUBLICATIONS

Motorola, M6800 microcessor application manual, 1975.

*Primary Examiner*—Reinhard J. Eisenzopf
*Attorney, Agent, or Firm*—Scully, Scott, Murphy & Presser

[57] ABSTRACT

A method for controlling the decelerated approach of an aerodyne on radio-alignment generally referred to as "glide," in particular for the purpose of reducing its fuel consumption and reducing the noise, mainly in the final stage of the approach, by approaching the glide at high speed, initiating the descent according to the glide angle, also at high speed then beginning a decelerated phase in order to reach a predetermined speed V sel +k, k being generally equal to 10 knots, on reaching a predetermined altitude, $h_F$, and then passing progessively from the speed V sel +k to the speed V sel. From the time when the aerodyne reaches the axis of the glide path, a course is determined in two sections, as regards the variables of speed and altitude, for reaching the point situated at the altitude $h_F$ at the given speed V sel +k, namely a first section, at the beginning of which the aerodyne which was previously travelling along the glide, begins a first braking stage, the speed of the aerodyne, during this first section, bein reduced by at least a predetermined speed $\Delta V_1$, and a second section, at the beginning of which the aerodyne initiates a second braking stage, the gradient dv/dh along these two sections having to satisfy the relationship $$P_{32} = k\, P_1$$

$P_1$ and $P_2$ being the respective gradients on each of the two sections and k being a value determined experimentally.

6 Claims, 7 Drawing Figures

METHOD AND SYSTEM FOR CONTROLLING THE DECELERATED APPROACH OF AN AERODYNE

The present invention relates to an improved method and system for controlling the decelerated approach of an aerodyne, in particular with a view to reducing its fuel consumption and reducing the noise, particularly in the final stage of the approach.

To obtain these results, it is possible to use a procedure consisting of attaining the glide angle (radio-alignment for guiding the angle of the aircraft) at high speed, of initiating the descent along the glide angle, also at high speed, then of beginning a decelerated phase by throttling back the engines in order to reach a predetermined speed V sel + 10 knots, on passing through an altitude $h_F$ and then of passing progressively from the speed V sel + 10 knots to the speed V sel, the altitude $h_O$ being sufficient so that at a lower altitude, it is possible to open the throttle if, for any reason, the approach had to be interrupted.

Naturally, during this approach procedure, the pilot must firstly lower the undercarriage and place the flaps progressively in a landing configuration, these operations being carried out so that as far as possible it is not necessary to open the throttle to compensate for aerodynamic braking resulting from these operations.

It is obvious that these various operations are interconnected and that consequently the essential problem which a system for controlling the decelerated approach of an aerodyne has to solve, consists in optimizing the delivery of orders for the various operations to be carried out during the approach and of determining the times when these operations are to be carried out as accurately as possible.

It should also be noted that a pure flying problem remains, which should be settled by a particular system for controlling the throttle lever and which makes it possible to maintain the aerodyne in the various desired configurations.

To achieve the afore-mentioned results, the invention firstly proposes a flying method consisting essentially, from the time when the aerodyne attains the glide path, of determining an adequate course, in two sections, as regards the variables speed and altitude for reaching a point located at an altitude $h_O$, for example 400 feet, at a given speed, for example V sel + Vo (Vo generally being equal to 10 knots) namely:

a first section at the beginning of which (point A, FIG. 1) the aerodyne which was previously travelling along the glide path, passes from the configuration of undercarriage retracted and flaps two notches from the final landing position (for example 8°) or from the configuration flaps 1 notch from the final landing position and undercarriage retracted or from the position flaps 2 notches from the final landing position and undercarriage lowered, to the configuration under carriage lowered, flaps 1 notch from the final landing position (for example 15°) and the throttle levers throttled back, the speed of the aircraft during this first section having to be reduced by at least a predetermined speed $\Delta V1$, for example of 20 knots.

a second section at the beginning of which (point B, FIG. 1) the pilot opens the flaps to the last notch, i.e. the final landing configuration (point C).

Therefore, in order to determine the afore-mentioned course in two sections, it is appropriate to make an estimation of the times or, in an equivalent manner, of the altitudes $h_A$ and $h_B$, from which it is necessary to undertake the operations necessary for initiating the first section and second section respectively, it being understood that the operation at the beginning of the first section must be carried out between the predetermined value $h_A$ and a value $h_A - \Delta h_A$, ($\Delta h_A$ possibly being equal to 200 feet) and that the operation at the beginning of the second section should be initiated at a height $h_B > \Delta h_B$ (for example $\Delta h_B = 600$ feet).

To carry out the determination of the altitudes $h_A$ and $h_B$, one uses in succession:

a first relationship relating to the fact that between the points A and B, the aerodyne should lose a predetermined speed $\Delta v1$, for example 20 knots.

a second relationship, obtained from experimental results and expressing the constancy of the gradients (by $dV/dh$), $P_1$ and $P_2$ of the aircraft on the two portions of the trajectory (AB, BC), namely $P_2 = k \, P_1$ (1), the value k being determined experimentally and a third experimental relationship in which the gradient $P_1$ depends on the derivative of the altitude h with respect to time, this gradient $P_1$ taking into account momentary characteristics of the aircraft, this relationship being able to be expressed for example as $$P_1 = b \frac{h'}{1 + 2S} + C \qquad (2)$$

b and c being constants > 0 and the expression $$\frac{1}{1 + 2S}$$

being the transmittance of a filtering member, s being the Laplace operator.

Owing to the fact that between the points A and B, the desired speed discrepancy is 20 knots, by using the afore-mentioned numerical values for the portion AB, by way of example, we may write the relationship $$h_A - h_B = \frac{20}{P_1} \qquad (3)$$

In a similar manner, for the portion BC $$h_B - 400 = \frac{1}{P_2}[\Delta Vo - 20] \qquad (4)$$

with $$\Delta Vo = VA - (V\,\text{sel} + 10)$$

From the relationships (3) and (4), it is possible to deduce the expression of $h_A$ $$h_A = 400 + \frac{20}{P_1} + \frac{(\Delta Vo - 20)}{P_2} \qquad (5)$$

Then, by substituting in the expression (5) the values of $P_1$ and $P_2$ provided by the relationships (1) and (2), one can deduce the following expressions:

$$h_A = 400 + \frac{20\,k + \Delta Vo - 20}{kP_1} = 400 + \frac{[20(k-1) + \Delta Vo]}{kP_1}$$

$$h_A = 400 + \frac{20(k-1) + V - (V\,\text{sel} + 10)}{kP_1} \qquad (6)$$

$$h_B = 400 + \frac{[V - V\,sel - 30]}{kP_1} \quad (7)$$

In these expressions, which provide the general values of $h_A$ and $h_B$ from the value V, a factor $$\frac{1}{1 + 2s}$$

is introduced which corresponds to the transmittance of a filtering member, s being the Laplace operator, these expressions thus becoming:

$$h_A = 400 + \left[ 20\,\frac{k-1}{k} + \frac{1}{k}\left[\frac{V - (V\,sel + 10)}{1 + 2s}\right] \right] \bigg/ \left( b \times \frac{h'}{(1 + 2s)} + C \right) \quad (8)$$

$$h_B = 400 + \frac{1}{k}\left[\frac{V - (V\,sel + 10)}{1 + 2s} - 20\right] \bigg/ \left( b \times \frac{h'}{1 + 2s} + C \right) \quad (9)$$

Assuming that $$\Delta V_F = \frac{V - (V\,sel + 10)}{(1 + 2s)},$$

the expressions (8) and (9) respectively become:

$$h_A = 400 + \left[ 20\,\frac{k-1}{k} + \frac{1}{k}\,\Delta V_F \right] \bigg/ \left( b \cdot \frac{h'}{1 + 2s} + C \right) \quad (10)$$

$$h_B = 400 + \frac{1}{k}\,(\Delta V_F - 20) \bigg/ \left( b \cdot \frac{h'}{1 + 2s} + C \right) \quad (11)$$

h' being the vertical speed of the aircraft
b and C being constants.

Thus, by means of a system of this type, flying of the aircraft comprises three essential phases, namely, a preparatory phase subsequent to attaining the glide angle, a first phase of deceleration whose starting point may be indicated for example by the illumination of an arrow on the control panel, which indicates that the aircraft is travelling at the previously defined altitude $h_A$ and requests the pilot to undertake actions of lowering the undercarriage and moving the flaps through a further notch, the arrow being extinguished when these actions have been undertaken and a second phase of deceleration whose starting point may be indicated by a further illumination of the arrow and which indicates that the time of opening the flaps to the last notch has arrived for achieving the target i.e. the point located at V sel + 10 and the altitude of 400 feet (point C).

During the preparatory phase, the aircraft is generally located in the configuration of flaps two notches from the final landing configuration and undercarriage retracted, in order to maintain a recorded speed.

One then proceeds with the following calculations, whilst having previously recorded the speed V sel; in this configuration:
one measures the speed discrepancy:

$$\Delta V_F = \frac{V - (V\,sel + 10)}{1 + 2s}$$

V being the instantaneous speed of the aircraft and one measuring the altitude of the aircraft by:

$$h_F = \frac{h\,ADC}{1 + 2s}$$

h ADC being the instantaneous altitude of the aircraft with respect to the ground and the vertical speed of the aircraft by $$h_F' = \frac{h'\,ADC}{1 + 2s},$$

h' ADC being the instantaneous vertical speed of the aircraft.

From these values, the calculations of $h_A$ may be effected as afore-mentioned by means of the formula:

$$h_A = 400 + \left[ 20\,\frac{k-1}{k} + \frac{1}{k} \times \Delta V_F \right] \bigg/ (b \cdot h_F' + C)$$

Once the altitude $h_A$ has been determined, the instantaneous altitude is compared with the altitude $h_A$ and the first illumination of the arrow occurs when $h_F$ becomes equal to, then remains less than or equal to $h_A$ for a predetermined period of time, for example two seconds.

From the time when the arrow is illuminated, the aircraft begins the first phase of deceleration, the pilot having to open the flaps by a further notch and lower the undercarriage, whereas an automatic lever throttles back the engines.

At the time when the arrow is extinguished, the values of the variables $\Delta V_F$, $h_F$ are recorded and memorized; these values will be respectively referred to hereafter as $\Delta V_{ME}$ as regards the value $\Delta V_F$ memorized at the time of the first extinction of the arrow and $h_{ME}$ as regards the value $h_F$ memorized at this same time.

The values $\Delta V_{ME} - \Delta V_F$ are then calculated at each instant $$P_1 = \frac{\Delta V_{ME} - \Delta V_F}{h_{ME} - h_F}$$

$$\Delta V\text{vis} = \Delta V_F - (h_f - 400) \times P_1 - 10$$

$$\gamma TCOR = \frac{\gamma T}{1 + 5s} + 3.0 \times \frac{h'}{1 + 5s} \times \frac{\Delta V\text{vis}}{h_F - 400}$$

$\gamma$ T being the total gradient of the aircraft, $$\Delta V c x = \Delta V_F = k \times P_1 \times (h_F - 400)$$

k depends on the aerodynamic characteristics of the aircraft and is equal for example to 1.45.

When one obtains the condition $(\Delta V_{ME} - \Delta V_F) \geq V_1$ knots and this condition is maintained for two seconds:
(a) the values of the variables $P_1$, $\Delta V\text{vis}$, $\gamma TCOR$, are recorded and memorized,
$\hat{P}_1$ being the value $P_1$ recorded and memorized,
$\hat{\Delta}V\text{vis}$ being the value $\Delta V\text{vis}$ memorized,
$\hat{\gamma}TCOR$ being the value TCOR memorized;

(b) in the case where ΔVvis ≧ 0 throttling back is maintained;

(c) on the other hand if ΔVvis < 0, a correction in the throttling is made, which makes it possible to restore γT to the value γTCOR;

(d) the value $\Delta V_{cx} = \Delta V_F - k\hat{P}_1 \times (h_F - 400)$ is calculated at each instant;

(e) when $\Delta V_{cx}$ becomes positive, an appropriate system causes a second illumination of the arrow which controls a possible return to throttling back and which indicates that it is necessary to open the flaps to the last notch in order to return to the final landing configuration.

The action on the throttle control may be effected by an automatic lever comprising a servo motor and a control which:

in the case where throttling back is desired, sends a control "to reduce" to the servo motor until it reaches an abutment corresponding to the throttled back position, in the case where ΔVvis < 0, it makes it possible to restore the total gradient γT of the aircraft to the measured value γTCOR.

For its implementation, a method of this type thus requires a calculator designed in order to be able to calculate:

the altitude $h_A$ facilitating initiation of the operation, the theoretical gradient $P_1$ from the detection of the vertical speed of the aircraft, the theoretical trajectory in the plane (V,h), the actual gradient $P_1$, by estimation at the time of each calculation cycle, the tendency of the trajectory after a drop in speed V from the point A and its relative position at the point C, the moment of opening the flaps to the last notch and the final landing position (for example 25°).

Furthermore, this calculator should be designed so that it is able to control:

the indicator indicating the times of opening the flaps and lowering the undercarriage, the throttle lever for bringing the latter into the throttled position or possibly for making a correction in the thrust.

It is therefore apparent that the nature of processing of the data of the decelerated approach function is characterised by:

a relatively small processing volume;

a relatively long calculation cycle, 0.5 seconds. There is therefore no problem of stability linked with the calculation cycle;

complex calculations. Calculations of the theoretical trajectory, estimation of the gradients and determination of the times of opening the flaps use arithmetical operations (including multiplication and division) and a certain number of pieces of information memorized for the purpose of subsequent comparison;

complex logic;

the use of time delays for eliminating transitory phenomena when opening the flaps and lowering the undercarriage.

In order to take all these factors into account, the invention proposes to undertake the processing of these data by means of a micro-processor whose design appears more appropriate than a system comprising:

either combined analog/logic mixing which is too heavy and ill-suited to carrying out the arithmetical operations the time delays and the memorizing of data, or the use of an on-board mini computer which would thus be too powerful for the application described.

Thus, the system for controlling the decelerated approach of an aerodyne according to the invention uses:

a central unit comprising a micro-processor of the INTEL 80 80 A or analog type whose input and output signals are shaped or adapted by means:

of a clock generator, of a system for generating control signals connected to a control bus, a circuit for adapting a data bus, a circuit for adapting an address bus, a programmable memory for storing the programme and a random access memory for the storage area, a circuit for managing interrupts at at least two interrupt levels, at least one real time clock for servicing these two interrupt levels, two input/output interfaces, namely:

an interface for logic signals comprising level translators and pre-processing members;

an interface for continuous signals ensuring digital-/analog conversion in both directions and analog storage, the differentiation between the various functions of this interface taking place by memory addressing and by combination of the various control signals.

According to another feature of the invention, the system for controlling the decelerated approach of an aerodyne according to the invention may also be equipped with a safety system comprising means for carrying out tests for the correct operation of the analog and digital inputs and outputs by feeding back an analog output into an analog input and by comparing the result obtained with a reference value in order to detect faults.

One embodiment of the invention will be described hereafter, as a non-limiting example, with reference to the accompanying drawings in which.

Figure 1:
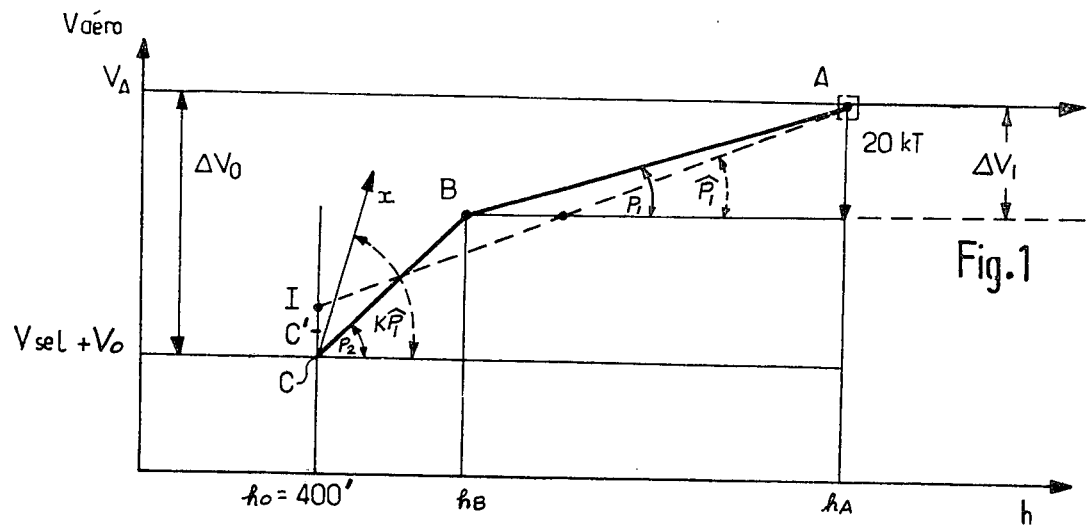
FIG. 1 is a theoretical diagram showing the aerodynamic speed as a function of the altitude of the aerodyne.

FIG. 1 makes it possible to illustrate the principle of the method and device for controlling the decelerated approach of an aerodyne according to the invention. The diagram of aerodynamic speed = f (altitude) which is illustrated in this figure shows the course in two sections AB and BC which the aerodyne follows along the glide path to reach the point C located at an altitude of 400 feet and at a speed of V sel + Vo, Vo being equal to 10 knots.

This diagram shows particularly:

the point A (altitude $h_A$) for which the system requires the pilot to lower the undercarriage and, if this has not already been lowered, to open the flaps by a further notch, the point B characterised by a speed discrepancy relative to the point A of 20 knots and by an altitude hB > $\Delta$hB for example $\Delta$hB=600 feet), the theoretical gradient $P'_1$ of the course AB having to satisfy the relationship $P_2=kP_1$, $P_2$ being the gradient of the course BC.

the point C which represents the target, of co-ordinates V=V sel +10 and h=400 feet.

the straight line Cx which leaves the point C and which has a gradient equal to $kP_1$, $P_1$ being the actual gradient of the aerodyne (course AI in broken-line).

the point C′ characterized by a discrepancy CC′ equal for example to 10 knots, the distance C′I corresponding to $\Delta$Vvis.

Figure 3:
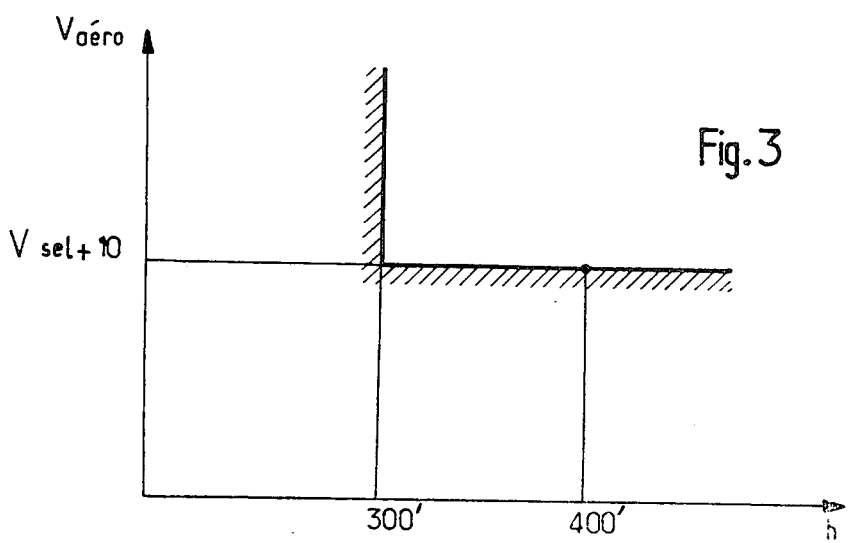
FIG. 3 is a diagram of speed as a function of altitude, which shows the limits beyond which the decelerated approach operation should be modified by acting on the throttle.

As afore-mentioned, the diagram shown in FIG. 3 shows the limits beyond which the decelerated approach manoeuvre must be modified by acting on the throttles.

Thus, if the aircraft reaches a speed less than the speed V sel + 10 knots, before having reached an altitude of 300 feet, the throttle should be opened; likewise, if the aircraft is travelling at a speed equal to or greater than V sel + 10 knots at an altitude of 300 feet, throttling-back should take place.

Figure 4:
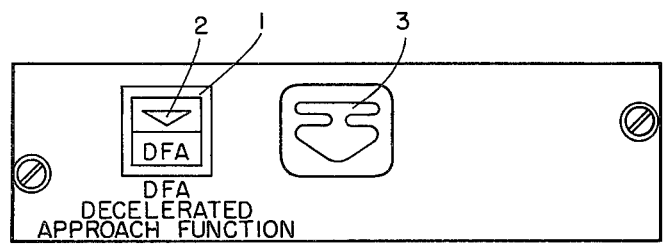
FIG. 4 is a diagrammatic view of the control panel of a decelerated approach system according to the invention.

With reference to FIG. 4, the control panel for the decelerated approach system comprises essentially:

a left-hand push-button 1 comprising two markings, namely DFA and a triangle 2, which is green for example, actuation of the button making it possible to select the function and the triangle 2 eliminating if the logic conditions are verified and if the operation is possible;

a central arrow 3 illuminating (for example in amber) when the system requires the pilot to open the flaps and lower the undercarriage.

In the example which will be described hereafter, the decelerated approach function is organised around a microprocessor of the type commercially available under the reference INTEL 80 80 A which constitutes the central processing unit of the system.

Figure 5:
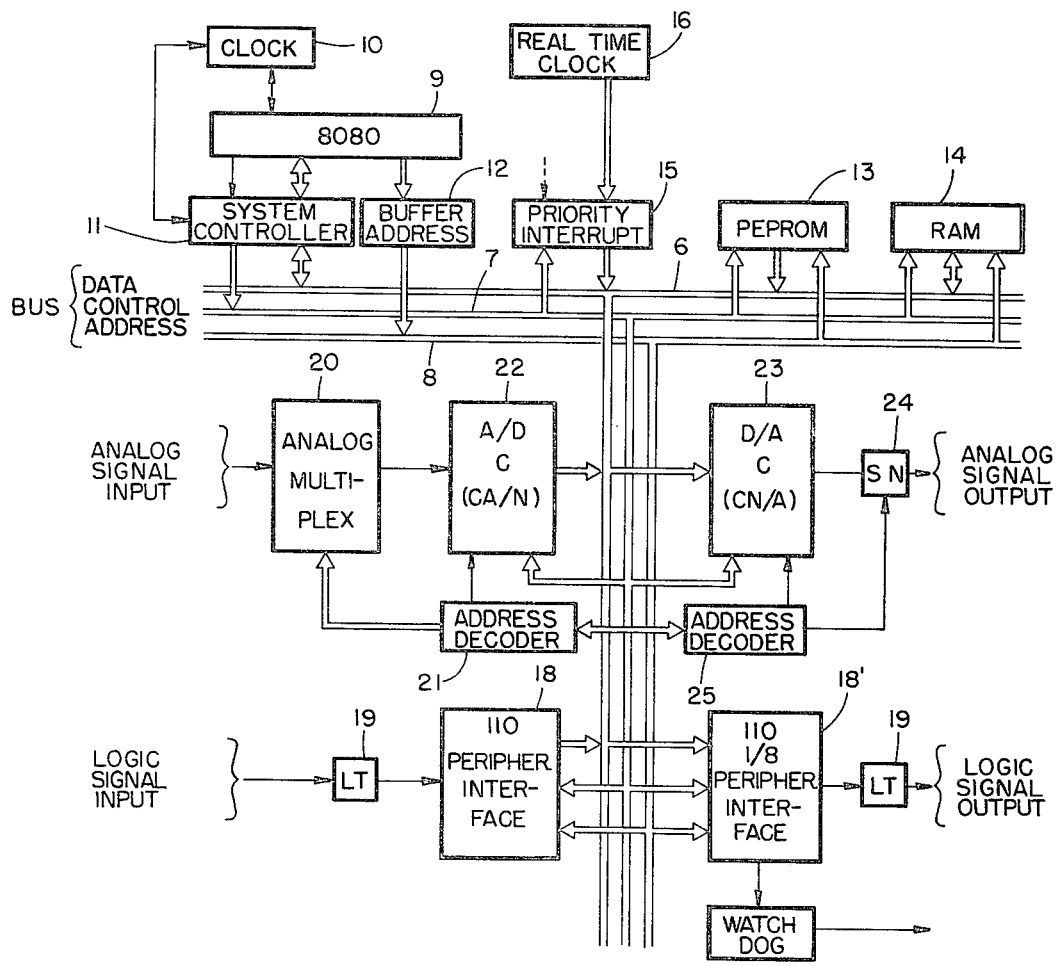
FIG. 5 is a simplified diagrammatic illustration of the structure of the equipment.
Figure 6:
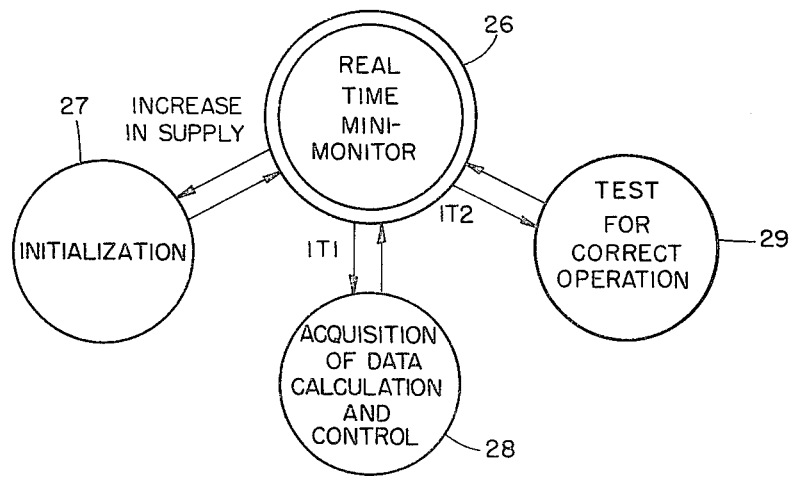
FIG. 6 is a diagrammatic illustration of the logic elements.

As shown in FIGS. 5 and 6, this system is composed of four parts interconnected by a triple bus, namely a data bus 6, a control bus 7 and an address bus 8, these four parts comprising:

the circuits ensuring digital processing,
the input/output interfaces,
pre-processing of analog signals,
supervisory circuits.

As regards the circuits ensuring digital processing, this part has the conventional structure of any digital calculator. It contains the central unit, the memories, the management of the interrupts and the real time clocks.

The central unit is organised around the microprocessor 9 of the 80 80 A (INTEL) type whose input and output signals are shaped or adapted by the following circuits:

a clock generator 10 having two phases,
a circuit for generating control signals,
a circuit for the adaptation of the data bus, these two circuits being connected (block 11) on the one hand to the clock and to the microprocessor 9 and on the other hand, to the data bus 6 and control bus 7.

an adaptor for the address bus 8 (buffer circuit 12) connected to the microprocessor 9 and to the address bus 8.

The memories are of two different types, namely a programmable memory REPROM 13 for storing the program and random access memories RAM 14 for the storage area.

Management of the interrupts is ensured by an eight level hierarchical circuit (block 15), balanced by two real time clocks (block 16). Each level may be de-activated and masked by programming. Only two interrupt levels are used by the application.

The two real time clocks 16 used respectively have a time cycle of 0.5 secs. and 5 secs. The faster clock comes from a monostable device mounted as a multivibrator. The slower is obtained by frequency division by means of a counter. The two clocks service the two interrupt levels.

As regards the input/output interfaces, the inputs-/outputs are logic and analog signals. The interfaces thus belong to two different families:

the interface for logic signals, blocks 18 and 18′ may comprise sixteen inputs and eight outputs. As an example of logic inputs, we may mention signals coming from selection micro contacts of the decelerated approach system, interrupters associated with the position of the flaps, signals coming from the various push-buttons, alarm signals, etc. Before being output from the interface, these logic signals are adapted by level translators 19 or are pre-processed;

the interface for the continuous signals ensures the conversion of analog signals in both directions. It makes it posible to process:

sixteen analog signals on input, these signals being transmitted to an analog multiplexer 20 controlled by a circuit for de-coding addresses 21, then each being converted into a word of twelve bits by an analog/digital converter 22, these signals consist essentially of signals of altitude (barometric), rate of descent, speed discrepancy, total gradient and test signals, two independent analog signals on output, by the bias of a digital analog converter 23 and an analog memorization circuit 24, controlled by an address de-coder 25 (sampler/ blocker circuits).

Differentiation between the various functions of this interface thus take place by memory addressing and by the combination of various control signals.

As afore-mentioned, the analog signals come from a transolver (altitude information in sin h and cos h) or from synchro (vertical speed information or speed discrepancy). The latter are modulated signals having an alternating reference at 400 Hz. It is necessary to demodulate the latter and adapt them to the conversion range of the analog/digital converter. In addition, to alleviate the processing of the microprocessor, filtering the noise of the input signals is carried out in analog when the cut-off frequency of the filter is too high.

A certain number of circuits are added to facilitate testing of input/output interfaces or for checking that the program is being carried out correctly. They are described in detail hereafter.

Furthermore, a certain number of outputs have been allocated for tests in flight:

one analog output for recording the parameters of the program. The choice of the various parameters takes place per program;

logic outputs indicating the point at which the program is carried out.

With reference to FIG. 6, the logic is composed:
of a real time mini-monitor 26,
of three independent tasks:
Initialization 27
Acquisition of data, calculation and control 28
Test for correct operation 29.

The real time mini-monitor is written for the purpose of being able to program each task as an independent block. It is the monitor which controls the carrying out of the various tasks and which interlinks them over a period of time depending on the priority assigned to each.

In view of the relatively simple nature of the application, the real time monitor described is reduced to managing the interrupts, triggered by the real time clocks 16 or the increase in the supply.

Only the context of the task having lesser priority interrupted by that of higher priority should be safeguarded. Thus, the restoration of its context enables this task to restart from the interrupted point.

Initialization is the task called by the monitor when the calculator is supplied.

The program de-masks the interrupt levels, initializes the counters and the storage areas of the other tasks and passes the control to the monitor.

The acquisition of data, calculations and control is activated by the monitor every 0.5 secs. and synchronized with the fast real time clock.

Figure 7:
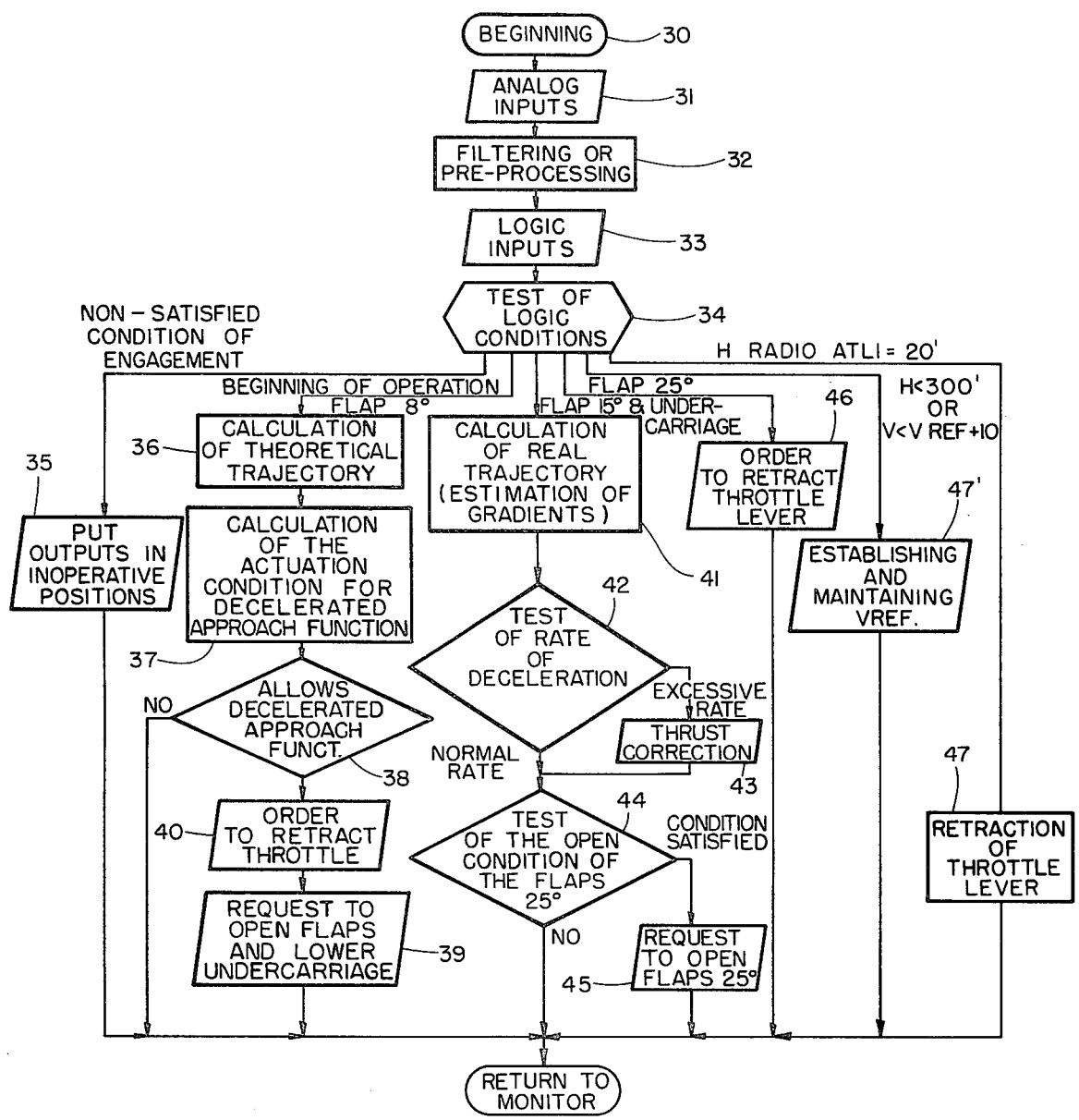
FIG. 7 is a simplified processing flow chart (acquisition of data, calculations and control).

The processing flow chart is shown in FIG. 7. The following various parts will be distinguished: acquisition and pre-processing of analog inputs and acquisition of logic inputs (blocks 30, 31, 32, 33).

(1) Pre-processing

Pre-processing consists of:
filtering and re-constitution of the altitude h from the two pieces of information cos h and sin h supplied by a transolver,
filtering of the vertical speed of the anemometric central unit (ADC),
filtering of the speed discrepancy,
calculation of the mean value of the total gradient $\gamma T$.

(2) Testing the logic conditions block 34

The logic conditions make it possible to distinguish the various phases of the decelerated approach function and direct the program to the specific processing operations:

non-satisfied condition of engagement: the program puts the outputs at the inoperative position (block 35).

(3) Beginning of the operation (flaps 8°)

The program calculates the theoretical trajectory (hA, hB, $P_1$, $P_2$) block 36, calculates the condition for activating the decelerated approach function block 37 and when the function is activated block 38 requires the flaps be opened to 15° and the undercarriage be lowered block 39 as well as control of the throttle lever retraction (throttled-back position) block 40.

(4) Deceleration phase flaps 15°

During this phase, the program calculates the real trajectory of the aircraft by estimating the real gradients in the plane Vh, block 41, and compares it with the theoretical trajectory block 42. If too high a rate of deceleration is detected after a drop in speed $\Delta V$ with respect to the reference point A, a thrust correction will be controlled block 43. Then, the program determines the time of requiring that the flaps be opened by 25° block 45 after testing the opening condition of the flaps at 25° block 44.

(5) Deceleration phase flaps 25°

During this phase, the program controls a retraction of the throttle lever block 46.

(6) End of operation

When the conditions $V<Vref+15$ or $H<300'$, the program establishes and maintains V ref (block 47'). When the radio-altimetric altitude becomes equal to or less than 20 feet the system causes retraction of the throttle lever (block 47). In the flow chart, the control delays are not shown. They are produced simply by counting a certain number of program cycles (0.5 secs) before initiating a control order.

The test for correct operation is activated by the real time monitor every 5 secs, synchronized with the slow real time clock. Its development may be interrupted by the higher priority acquisition calculation and control task and is resumed after the latter has been carried out. In this task, the program carries out a certain number of simplified automatic tests making it possible to check the correct operation of the equipment. These tests are described in detail in the following chapter dealing with safety.

In practice, the decelerated approach function operates in an open loop and most of the time the throttle lever is controlled on the throttled-back abutment. An anomaly in the system may be detected by the pilot who has sufficient time to resume manual control of the aircraft.

Despite this advantage due to the design of the system, the decelerated approach calculator has a certain number of devices making it possible to ensure supervision of the operation.

In the design of the equipment, the inoperative state of the relays controlled by the digital outputs corresponds to disconnection of the operation and de-activation of the control of the throttle lever.

If the system breaks down, either by the absence of a current supply, or due to the detection of a fault in the equipment, these realys will be in their inoperative position.

Certain circuits make it possible to check that the program is taking place correctly and to indicate a breakdown of the equipment to the pilot.

Logic tests make it possible to check the memory and the input/output interfaces by the program.

Figure 2:
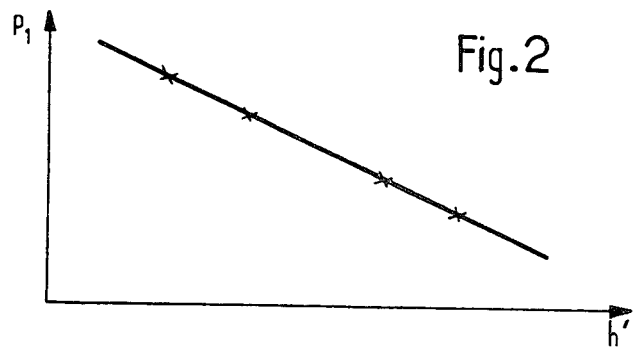
FIG. 2 is a diagram making it possible to show the fact that the gradient $P_1$ is, for example, a linear function of the derivative with respect to time of the altitude h of the aircraft.

The equipment used for supervising the decelerated approach function belongs to two categories:
analog and logic inputs and outputs used by the program for testing correct operation carried out every 5 seconds.
the safety system "watchdog" (FIG. 2).

As regards the analog and digital inputs and outputs:
the analog/digital and digital/analog converters are checked by feeding back an analog output into an analog input; comparison of the result obtained with the reference makes it possible to detect faults.

since the digital outputs are used for controlling indicators on the control panel, they make it possible to indicate a corresponding fault in the equipment to the pilot.

The security system "watchdog" (block 25 connected to the interface for the logic outputs) is a piece of equipment making it possible to check that the program is being implemented correctly. The latter is a monostable whose input is triggered by a pulse generated by an output instruction placed in the program. The width of the output pulse of the monostable is calibrated as a function of the duration of the calculation cycle.

Absence of carrying out the instruction for controlling the monostable (on account of a fault in the processor or feed back of the program) indicates incorrect operation; this is indicated to the pilot by the disappearance of the green rectangle on the control panel.

The logic devices ensuring safety are incorporated in the two acquisitiin tasks, calculation and control and test for correct operation:

in the first task, calculations of probability are carried out at the inputs. They make it possible to check the acquisition of data and at the same time to detect faults in the detectors. In addition, digital calculation makes it possible to check very simply the altitude information supplied by the two outputs of the transolver (to check $\cos^2 h + \sin^2 h = 1$), in the second task, the program periodically carries out the following tests for correct operation:

test of the A/D and D/A converters.

By the program, a known value is controlled at the input of the D/A converter. Its output is connected to an input of the A/D converter. The digital result of the conversion is compared with the known controlled value.

Test of the memories

The contents of the program memories (REPROM) are checked by adding all the octets. The result should be equal to the pre-programmed value. The working memories (RAM) are tested by reading and comparison.

As regards problems connected with the construction of the system:

I Equipment

Within the framework of an experiment, the modules of the decelerated approach function have been implanted in a calculator already existing for another function and which also uses information of the total gradient. This arrangement makes it possible to use the actual interconnections of the aircraft and to carry out the tests in flight within a reasonable period of time.

The empty locations make it possible to insert five cards having dimensions of 163×112 mm; the necessary stabilized supply already exists in the calculator.

The limitations of the equipment impose a certain number of constraints in the structure of the equipment:

volume: the five cards of the decelerated approach function are:

processor card, management of the interrupts, real time clock and 2 K octets of REPROM (reserve), memory card containing 4 K of REPROM and 1 K of RAM, conversion card making it possible to achieve the analog/digital conversion (16 paths) and digital/analog conversion (2 paths), card for adaptation of the analog inputs and outputs logic interface card.

II logic

The decelerated approach function has been written in high level language PL/M.

The use of high level language in the place of assembler language facilitates:

a shorter training period for the programmers;

ease of programming. The programmers no longer need to understand the structure of the microprocessor;

higher efficiency (writing time per program);

clear documentation;

the application of structured programming.

What is claimed is:

1. A method of controlling the decelerated approach of an aircraft on glide radioalignment, said aircraft having equipment comprising at least one landing gear which can take the positions gear retracted and gear down, at least one control surface such as a flap which can take at least three positions, flap in final position for landing, flap at one notch from the final position for landing, and flap at two notches from the final position for landing, and a throttle having a slow position, comprising the following steps:

(a) approaching the capture of glide at high speed, at which the aircraft equipment is in the positions gear retracted and flap at two notches from the final position for landing;

(b) determining, at the capture of the glide, a theoretical trajectory in two stages, AB and BC, in a program of speed/altitude variables, the trajectory having the following characteristics, (i) point C is situated at a predetermined altitude ho and at a speed Vsel+Vo (Vsel being a predetermined speed and Vo a reference speed), (ii) in the first stage AB, the speed of the aircraft is reduced by at least a predetermined speed $\Delta V_1$, and (iii) the slope along these two stages satisfies the equation $$P2 = kP1$$

P1 and P2 being the respective slopes of stages AB and BC, with k being an experimentally determined value;

(c) determining an altitude hA which the aircraft is to reach in the first stage;

(d) decelerating the aircraft in a first phase including at the start thereof engaging the landing gear in the gear down position and engaging the flap at one notch from the final position for landing;

(e) determining the actual trajectory of the aircraft and comparing the actual trajectory with the theoretical trajectory;

(f) correcting the power by manipulating the throttle if the total deceleration is too great after a decrease of speed $\Delta V$ compared to point A;

(g) determining the altitude $h_B$ where the second stage should begin;

(h) decelerating the aircraft in a second phase at the beginning of which the flap is engaged in final position for landing and the throttle is placed in the slow position;
(i) correcting the power by manipulating the throttle; and
(j) capturing and maintaining Vref, whereby the speed of the aircraft should be less than the speed Vsel+Vo and/or the altitude of the aircraft is reduced below a predetermined altitude.

2. A method of controlling the decelerated approach of an aircraft on glide radioalignment, said aircraft having equipment comprising at least one landing gear which can take the positions gear retracted and gear down, at least one control surface such as a flap having at least three positions, flap in final position for landing, flap at one notch from the final position for landing, and flap at two notches from the final position for landing and a throttle having a slow position, comprising the following steps:
(a) approaching the capture of glide at high speed, at which the aircraft equipment is in the positions gear retracted and flap at one notch from the final position for landing;
(b) determining, at the capture of glide, a theoretical trajectory in two stages, AB and BC, in a program of speed/altitude variables, the trajectory having the following characteristics,
  (i) point C is situated at a predetermined altitude ho and at a speed Vsel+Vo (Vsel being a predetermined speed and Vo a reference speed),
  (ii) in the first stage AB, the speed of the aircraft is reduced by at least a predetermined speed $\Delta V_1$,
  (iii) the slope along these two stages satisfies the equation $$P2 = kP1$$

P1 and P2 being the respective slopes of stages AB and BC, with k being an experimentally determined value;
(c) determining an altitude hA which the aircraft should reach in the first stage;
(d) decelerating the aircraft in a first phase including at the start thereof engaging the landing gear in the gear down position and maintaining the flap at one notch from the final position for landing;
(e) determining the actual trajectory of the aircraft and comparing the actual trajectory with said theoretical trajectory;
(f) correcting the power by manipulating the throttle if the total deceleration is too great after a decrease of speed $\Delta V$ compared to point A;
(g) determining the altitude where the second stage should begin;
(h) decelerating the aircraft in a second phase at the beginning of which the flap is engaged in final position for landing and the throttle is placed in the slow position;
(i) correcting the power by manipulating the throttle; and
(j) capturing and maintaining Vsel, whereby the speed of the aircraft should be less than the speed Vsel+Vo and/or the altitude of the aircraft is reduced below a predetermined altitude.

3. A method of controlling the decelerated approach of an aircraft on glide radioalignment, said aircraft having equipment comprising at least one landing gear which can take the positions gear retracted, and gear down, at least one control surface such as a flap which can take at least three positions, flap in final position for landing, flap at one notch from the final position for landing, and flap at two notches from the final position for landing, and a throttle having a slow position, comprising the following steps:
(a) approaching the capture of glide at high speed at which the aircraft equipment is in the positions flap at two notches from the final position for landing, and gear down.
(b) determining, at the moment of capture of glide, a theoretical trajectory in two stages, AB and BC, in a program of speed/altitude variables, the trajectory having the following characteristics,
  (i) point C is situated at a predetermined altitude ho and at a speed Vsel+Vo (Vsel being a predetermined speed and Vo a reference speed),
  (ii) in the first stage AB, the speed of the aircraft is reduced by at least a predetermined speed $\Delta V1$, and
  (iii) the slope along the two stages satisfies the equation P2=kP1, P1 and P2 being the respective slopes of stages AB and BC, with k being an experimentally determined value;
(c) determining an altitude hA which the aircraft should reach in the first stage;
(d) decelerating the aircraft in a first phase including at the beginning thereof engaging the landing gear in the position gear down and the flap at one notch from the final position for landing;
(e) determining the actual trajectory of the aircraft and comparing the actual trajectory with the theoretical trajectory;
(f) correcting the power by manipulating the throttle if the total deceleration is too great after a decrease of speed $\Delta V$ by comparison to point A;
(g) determining the altitude where the second stage should begin;
(h) decelerating the aircraft in a second phase at the beginning of which the flap is engaged in final position for landing and the throttle is placed in the slow position;
(i) correcting the power by manipulating the throttle; and
(j) capturing and maintaining Vsel, whereby the speed of the aircraft should be less than the speed Vsel+Vo and/or the altitude of the aircraft is below the predetermined altitude.

4. A method for controlling the decelerated approach of an aircraft on glide, said aircraft having equipment comprising at least one landing gear which can take the positions gear retracted and gear down, at least one control surface such as a flap which can take at least three positions, flap in final position for landing, flap in one notch from the final position for landing, and flap at two notches from the final position for landing, and a throttle comprising a slow position, comprising at least the following steps:
a preparatory phase following capture of glide, at the beginning of which the aircraft equipment is in the positions flaps at two notches from the final position for landing, and gear retracted, in which the speed of the aircraft is maintained at a predetermined speed, and during which one carries out the calculation,
from the altitude hA to which the aircraft should reach within a course of two stages AB and BC, in a program of speed/altitude variables, this trajectory being such that (i) point C is situated at a predetermined altitude ho and at a speed Vsel+Vo (Vsel being a predetermined speed and Vo a reference speed), (ii) in the first stage AB, the speed of the aircraft is reduced by at least a predetermined speed $\Delta V1$, (iii) the slope along the two sections satisfies the equation P2=kP1, with P1 and P2 being the respective slopes of stages AB and BC, and k being an experimentally determined value, from the variation of the speed $\Delta VF$ $$\Delta VF = \frac{V - (Vsel + Vo)}{1 + 2S},$$

with

V being the instantaneous speed of the aircraft,

S being the Laplace operator,

Vsel being a predetermined speed,

Vo being a reference speed, from the vertical speed of the aircraft which is designated as h'F, once the altitude hA is determined, comparing the instantaneous altitude hF with the altitude hA, generating a first signal wherein the instantaneous altitude hF becomes equal, then is less than or equal to hA for a predetermined period, a first deceleration phase starting from the moment wherein the generation of the first signal commences, this involving the engagement of a supplemental flap and the operation of the throttle on slowing down, the extinction of said first signal wherein the two preceding operations have been carried out, the determination and storage in memory of values $\Delta VF$ and hF, these values, once stored, being respectively denominated $\Delta VME$ and hME, the calculation of $$P1 = \frac{\Delta VME - \Delta VF}{hME - hF},$$

wherein P1 is the slope as previously defined, and $\Delta V_{vis} = \Delta VF - (hF - ho) \times P1 - 10$, wherein the defined variable $\Delta Vvis$ is related to a variation in speed of the aircraft which is dependent upon the aerodynamic characteristics of the aircraft, ho being the altitude which the aircraft must pass at the speed (Vsel+Vo), $$\gamma TCOR = \frac{\gamma T}{1 + 5S} + 3.0 \times \frac{h'}{1 + 5S} \times \frac{\Delta V vix}{hF - ho}$$

$\gamma T$ being the total slope of the aircraft, wherein the condition $(\Delta VME - \Delta VF) \geq 20$ knots is realized, determining and storing in memory the values of the variables P1, $\Delta Vvis$, $\gamma TCOR$, in the case wherein Vvis<0, maintaining the throttle in the slow position, in the case wherein Vvis>0, controlling the throttle to result in the total slope $\gamma T$ having the value $\gamma TCOR$, calculating at each moment the value, $\Delta Vcx = \Delta VF - 1.75 \hat{P}1 \times (hF - ho)$, wherein $\Delta Vcx$ is related to a variation in speed of the aircraft as defined, $\hat{P}1$ being the value of P1 placed in the memory, generating a second signal wherein $\Delta Vcx$ will be positive, engaging a last notch by the flap which is in the final configuration for landing, extinguishing the second signal when this action upon the flap is carried out.

5. A method according to claim 4, characterized in that it comprises the following steps:

I—acquiring and preprocessing analog inputs and acquisition of logic inputs, the preprocessing comprising, (a) filtering and reconstituting the altitude h from two inputs cos h and sin h delivered by a transolver, (b) filtering the vertical speed from a central anemometer (ADC), (c) filtering the speed discrepancy, (d) calculating the mean value of the total slope $\gamma T$, II—Testing logic conditions making it possible to distinguish the different phases of the decelerated approach function and controlling the specific processing operations, (e) condition of engagement not satisfactory, place the outputs in the inoperative position, (f) at the beginning of the maneuver, positioning the flap at two notches from the final configuration for landing, calculating the theoretical trajectory ($h_A$, $h_B$, $P_1$, $P_2$), of the condition of activation for the decelerated approach function and when the function is activated, a command of engagement of the flap and gear as well as a command for the drawing back of the throttle to slow position, and wherein $h_B$ is the altitude of the aircraft at the initiation of the second stage BC, (g) deceleration phase comprising, placing the flap at one notch from the final configuration for landing, determining the actual trajectory of the aircraft by estimating the actual slopes in the program of speed/altitude variables and comparing it with the theoretical trajectory if a total deceleration too high is detected after a fall of speed $\Delta V$ with respect to the point of reference A, correcting the thrust, determining the moment of engagement of the flap in final configuration for landing and placing the flap in the final configuration for landing, (h) decelerating phase and commanding a drawing back of the throttle, (i) at the end of the maneuver placing the equipment at the start position, selection of a speed mode holding the speed automatically.

6. A method according to claim 4, characterized in that the action on the throttle command is carried out automatically in a system comprising a servomotor and a control arrangement which, in the case wherein one desires slowing down, sending the servomotor a command to reduce to attain a stop corresponding to the slow position, and in the case wherein $\Delta Vvis<0$, permitting one to ascertain the total slope $\gamma T$, and the measured value $\gamma TCOR$, wherein $\Delta Vvis$ is related to a variation in speed of the aircraft which is dependent upon the aerodynamic characteristics of the aircraft as defined.

* * * * *

UNITED STATES PATENT AND TRADEMARK OFFICE
CERTIFICATE OF CORRECTION

PATENT NO. : 4,232,839
DATED : November 11, 1980
INVENTOR(S) : Jean-Luc Sicre and Daniel Gruaz It is certified that error appears in the above-identified patent and that said Letters Patent are hereby corrected as shown below:

Abstract, line 19, "bein" should be --being--

Column 4, line 17, "$h_{F'}$" should be --$h'_F$--

Column 4, line 25, "$h_{F'}$" should be --$h'_F$--

Column 4, line 57, "=k" should be -- -k --

Column 5, line 68, "memorizing" should be --memorization--

Column 11, line 21, "acquisitiin" should be --acquisition--.

Signed and Sealed this

Twenty-first Day of April 1981

[SEAL]

Attest:

RENE D. TEGTMEYER

Attesting Officer    Acting Commissioner of Patents and Trademarks